United States Patent [19]
Harris et al.

[11] Patent Number: 4,816,849
[45] Date of Patent: Mar. 28, 1989

[54] DUAL LENS SECURITY CAMERA

[75] Inventors: J. Roy Harris, Norco; Robert L. Sundstrom, Cypress, both of Calif.

[73] Assignee: American Electronics, Inc., Fullerton, Calif.

[21] Appl. No.: 10,229

[22] Filed: Feb. 3, 1987

[51] Int. Cl.⁴ .............................................. G03B 1/00
[52] U.S. Cl. .................................... 354/120; 354/204
[58] Field of Search .............. 354/120, 105, 109, 106, 354/204, 266, 269

[56] References Cited

U.S. PATENT DOCUMENTS 2,791,164  5/1957  Faulhaber ........................... 354/204

Primary Examiner—L. T. Hix
Assistant Examiner—Brian W. Brown
Attorney, Agent, or Firm—Charles E. Wills

[57] ABSTRACT

A light-weight, manually-operable security camera for photographing a person and a person's documentation in a single exposure. A camera with a first lens positioned for providing an image of a person standing in front of the camera and a second lens for providing an image of a document on a horizontal surface, and a drive mechanism for driving a single shutter and for advancing film in the film magazine, with the drive mechanism also including a lever for actuation by the person taking the photographs, and an extension spring and one-way clutch mechanism interconnecting the lever and the shutter and film advance means to assure that the lever is fully depressed and the film advanced, before a second set of photographs is attempted.

7 Claims, 5 Drawing Sheets

DUAL LENS SECURITY CAMERA

BACKGROUND OF THE INVENTION

This invention relates to mechanisms for actuating cameras, and in particular to a new and improved mechanism for manual operation of a dual lens camera of the type used for security purposes.

Security cameras having one lens for taking a photograph of a person and a second lens for taking a photograph of a document provided by the person, such as an identification card, are currently in use. The prior art camera utilizes a film magazine which is slideably inserted into and removed from a camera housing. A single shutter is positioned between the two lenses and the film magazine exposure opening, in order to produce the two images per frame of exposure. The camera also incorporates a drive mechanism which is actuated by security personnel, to operate the shutter and to advance the film in the film magazine. This prior art drive mechanism includes a lever coupled to the camera mechanism drive line, with downward movement of the lever rotating a camera drive shaft in a first direction and raising a counterweight, with the action of gravity on the counterweight raising the lever when released by the operator and rotating the camera drive shaft in the opposite direction.

In the prior art camera, the counterweight is suspended in an enclosure and is required to have considerable mass in order to achieve proper operation. This results in a relatively large and heavy overall device, with accompanying high shipping charges. Also, the presence of the counterweight results in considerable noise and balance problems during packing, shipping and operation of the camera.

It is a principal object of the present invention to provide a dual lens security camera with a new and improved operating mechanism which obviates the problems encountered in the use of a counterweight in the drive mechanism. Other objects, advantages, features and results will more fully appear in the course of the following description.

SUMMARY OF THE INVENTION

A camera having a frame, a first lens and a second lens, a shutter for the lenses, a film magazine holder, and drive means for driving the shutter and advancing film in the magazine for taking a single exposure, a photograph of a person in front of the first lens and a photograph of a document under the second lens. The camera has a drive mechanism which is actuated by pressing downwardly on a lever mounted in the frame which supports the camera mechanism. The drive mechanism also includes two rotating drive shafts with a drive line coupled to the drive shafts and connected between the lever and a tension spring so that actuation of the lever rotates the one drive shaft in one direction and release of the lever permits the spring to rotate the other drive shaft in the opposite direction, to drive the camera shutter and advance the film and thereby provide a complete exposure cycle for the camera.

Further, a clutch mechanism is coupled to the lever by a link and spring arrangement for controlling lever action. Preferably the clutch connection includes a link between the moving portion of the clutch and the lever, with a pair of springs also connected between the link and the lever.

DESCRIPTION OF THE PREFERRED EMBODIMENT

Figure 1:
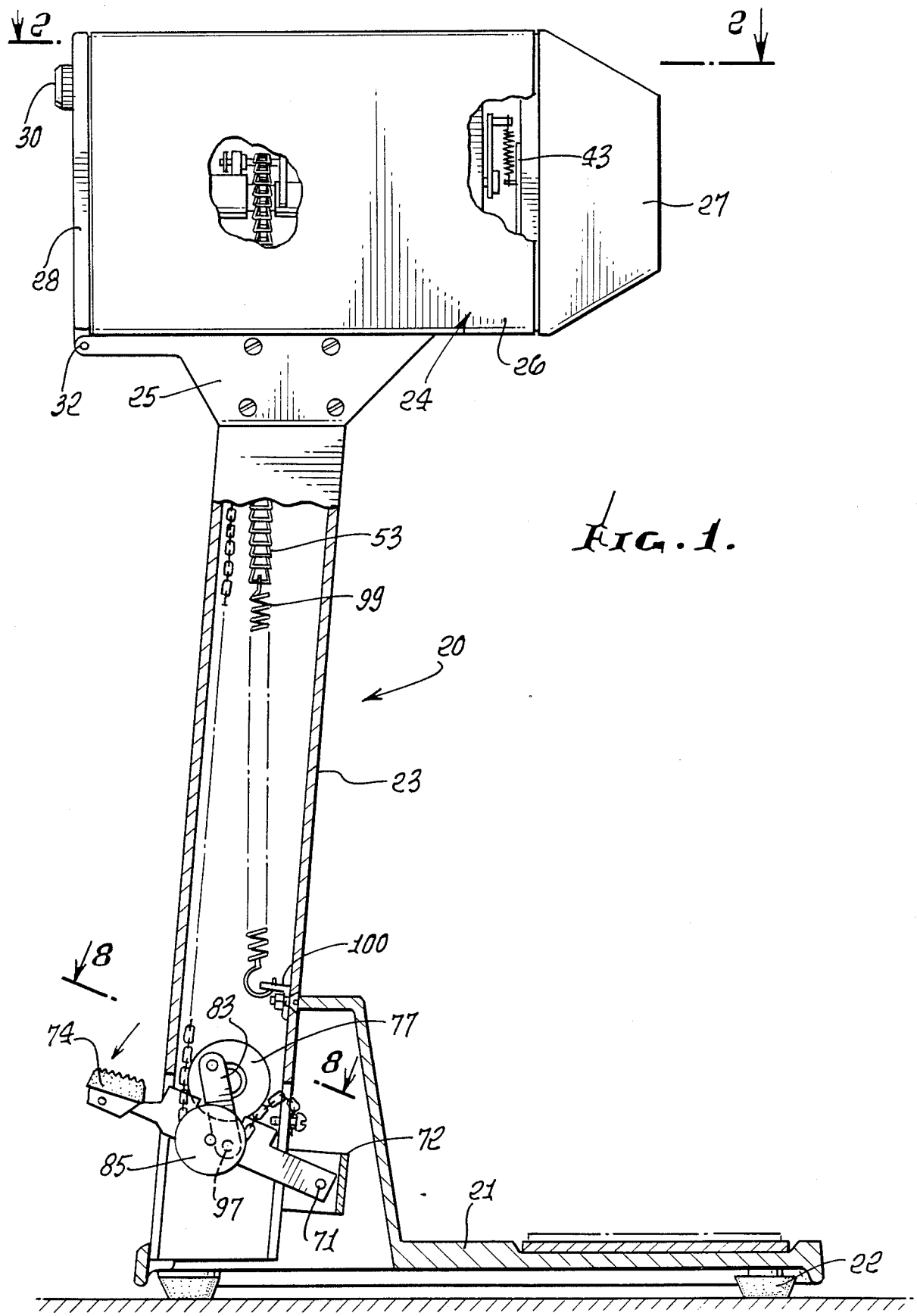
FIG. 1 is a side view, partially in section, showing a dual lens security camera incorporating the presently preferred embodiment of the invention.

The camera illustrated in the drawings has a frame 20 incorporating a base 21 with feet 22 for resting on a counter top or the like, an upright tube 23, and a housing indicated generally at 24. The housing includes a base 25 mounted on the upper end of the tube 23, with a shroud 26, a lens block 27, and an access door 28. The base typically is a casting which provides for secure attachment to the upright tube 23 and also provides a support for the camera mechanism within the housing.

Figure 3:
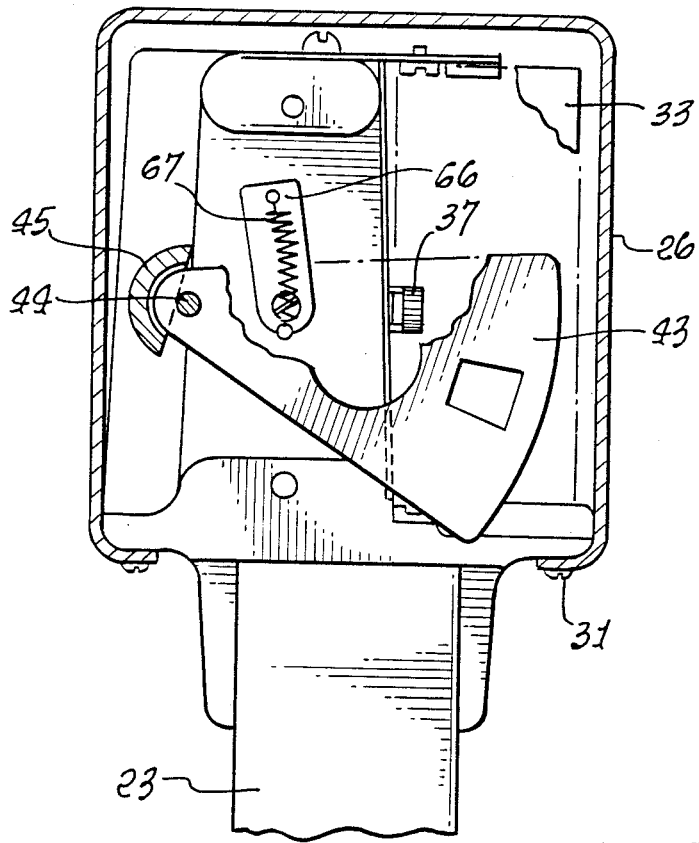
FIG. 3 is a vertical sectional view taken along the line 3—3 in FIG. 2.

The lens block 27 is attached to the base 25 by screws, not shown. The shroud 26 is attached to the base by screws 31 (FIG. 3). The door 28 is attached to the base 25 by a hinge pin 32 which permits opening of the housing for insertion and removal of a film magazine or cassette 33. The door 28 is opened and closed by means of a knob 30 attached to the door.

Figure 2:
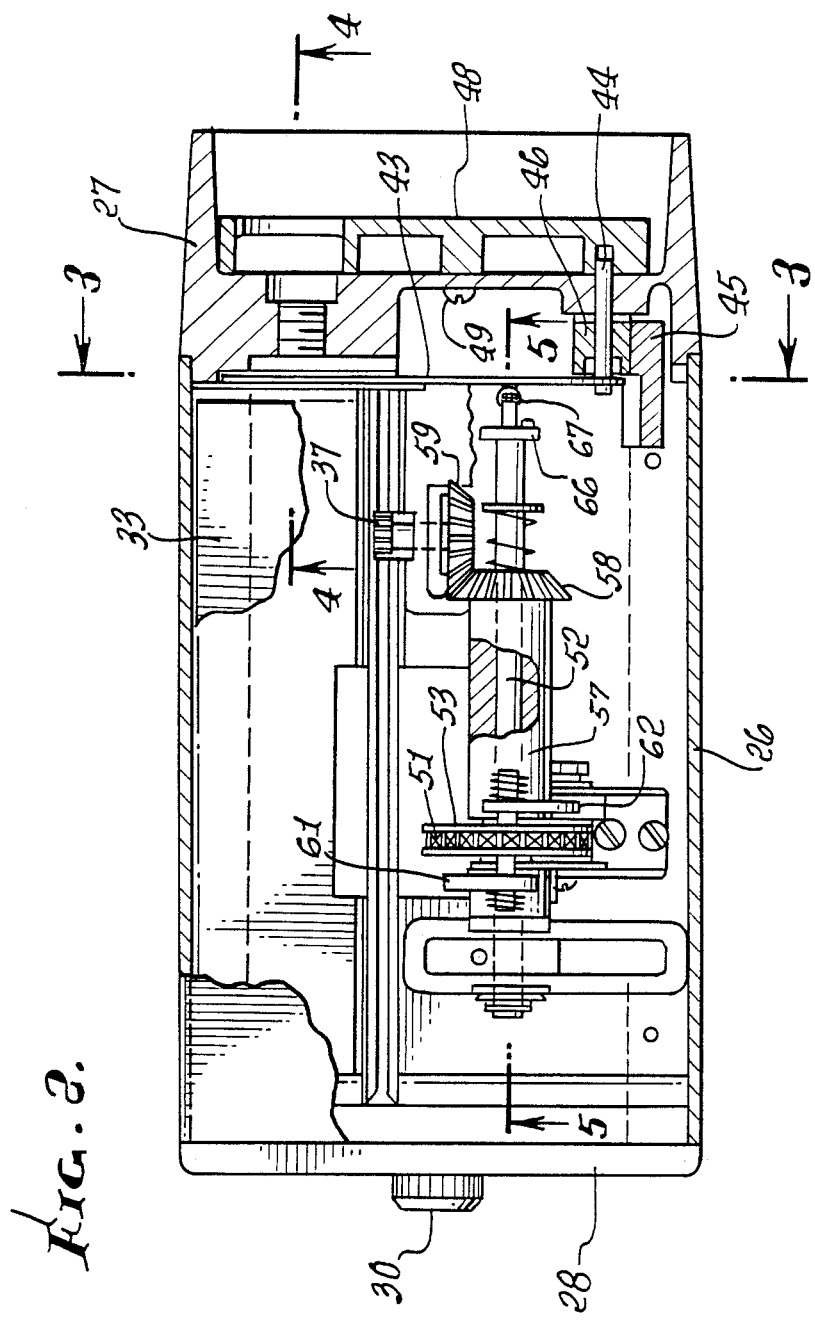
FIG. 2 is an enlarged horizontal sectional view taken along the line 2—2 in FIG. 1.
Figure 4:
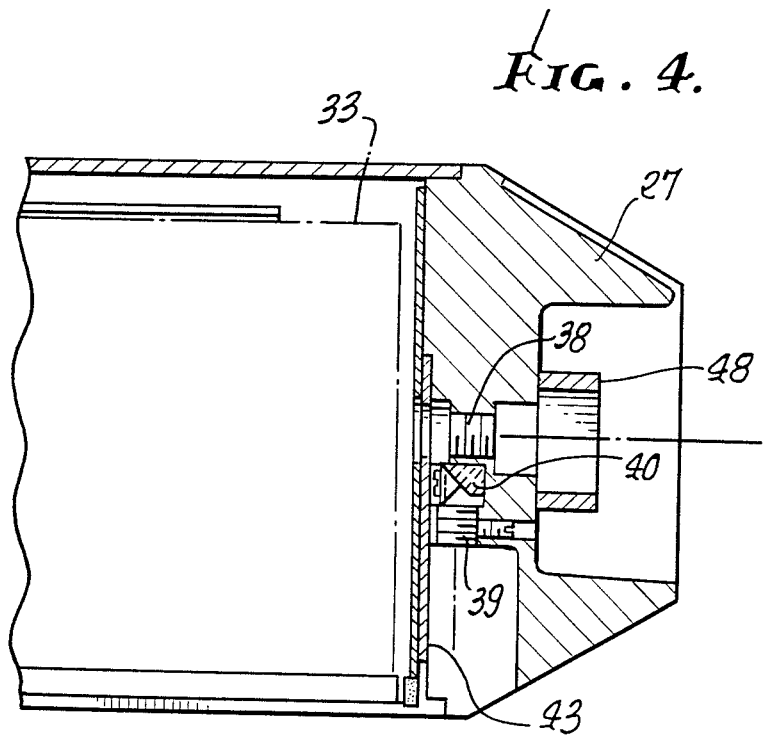
FIG. 4 is a horizontal section view taken along the line 4—4 in FIG. 2.

The film magazine 33 is a conventional product and has an internal mechanism for advancing film, which mechanism engages a drive gear 37 when the magazine is in place in the camera (FIGS. 2 and 3). A lens 38 is mounted in the nose block (FIG. 4) for imaging a person in front of the housing as shown in FIG. 1. Another lens 39 is mounted in the nose block for imaging a document such as an ID card resting on the base 21. A mirror 40 is mounted in the nose block at a 45° angle so that the two lenses 38, 39 will provide two images in parallel paths to the film within the magazine 33.

A shutter 43 is carried on a shaft 44 which pivots in the lens block 27 (FIG. 2). The shutter is balanced by a counterweight 45 carried on a sleeve 46 attached to the shaft 44. Another block 48 is mounted on the exterior surface of the lens block 27 by a screw 49. This block serves in part as a lens shroud and also provides a decorative surface for viewing by the subject being photographed.

Figure 5:
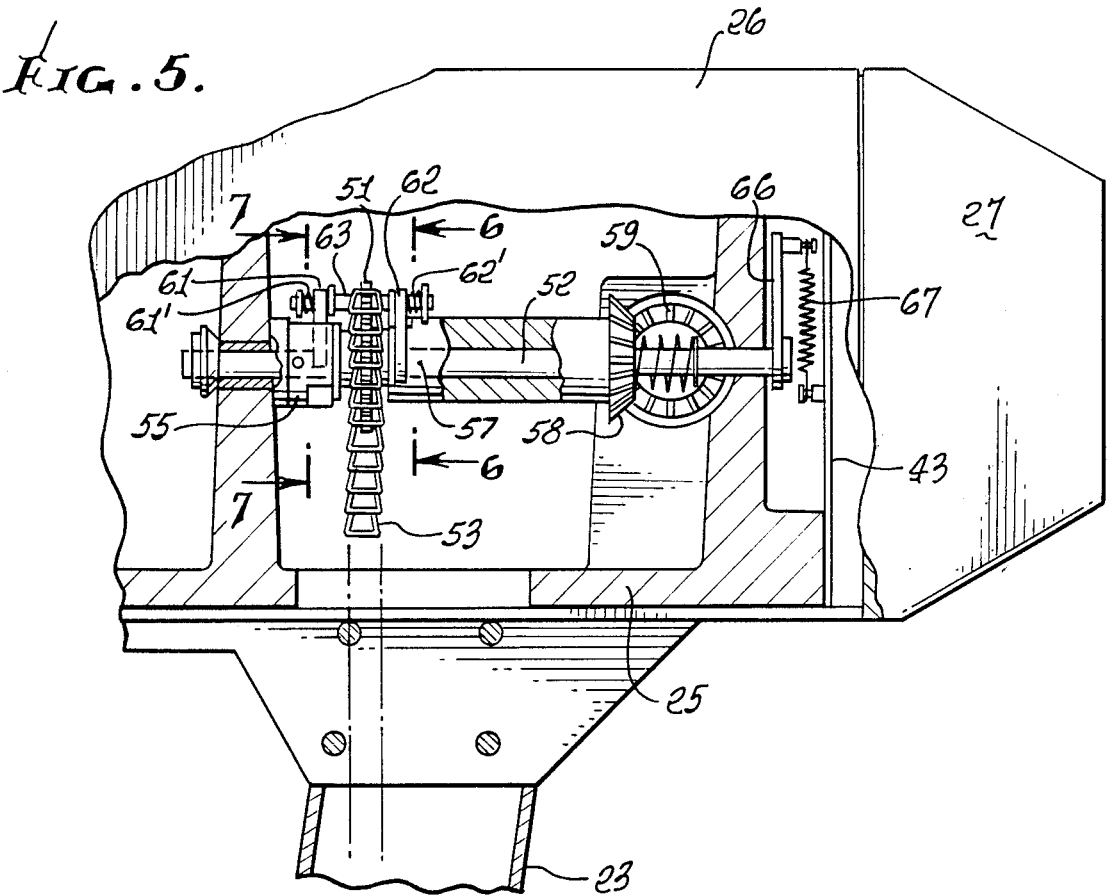
FIG. 5 is an enlarged partial side view corresponding to that of FIG. 1, taken along the line 5—5 in FIG. 2, with a portion of the housing broken away.
Figure 6:
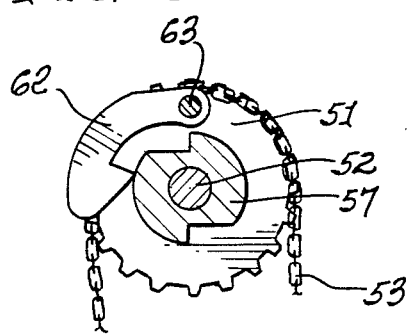
FIG. 6 is an partial sectional view taken along the line 6—6 in FIG. 5.
Figure 7:
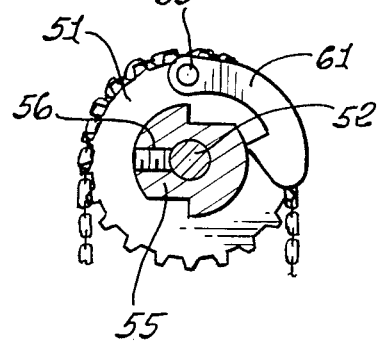
FIG. 7 is an enlarged partial sectional view similar to that of FIG. 6 and taken along the line 7—7 in FIG. 5.
Figure 8:
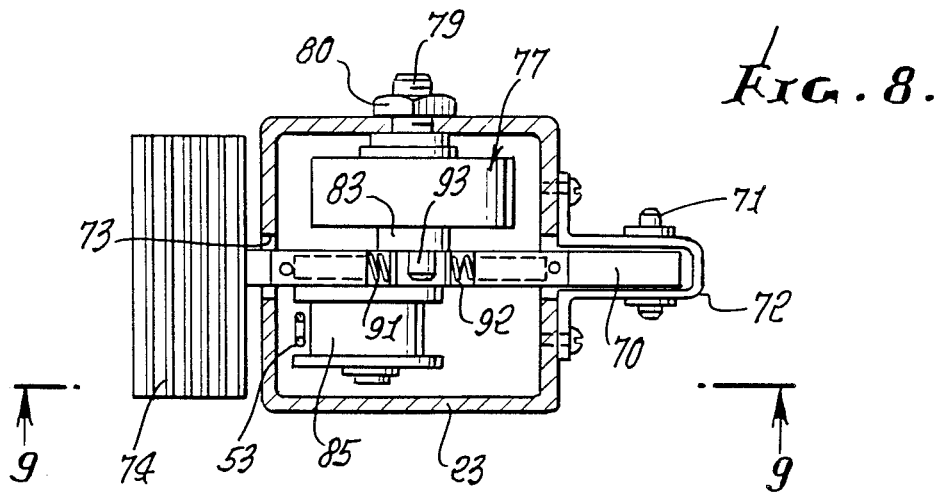
FIG. 8 is an enlarged sectional view taken along the line 8—8 in FIG. 1.
Figure 9:
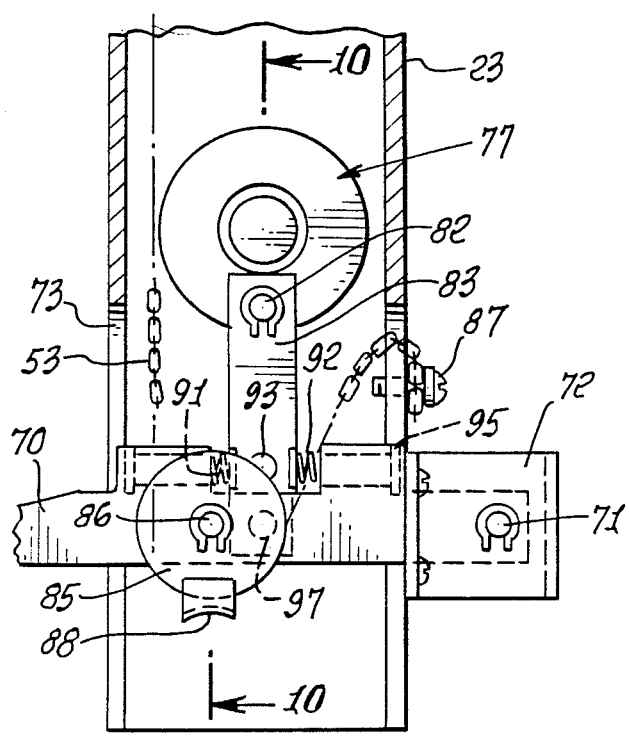
FIG. 9 is a vertical sectional view taken along the line 9—9 in FIG. 8.
Figure 10:
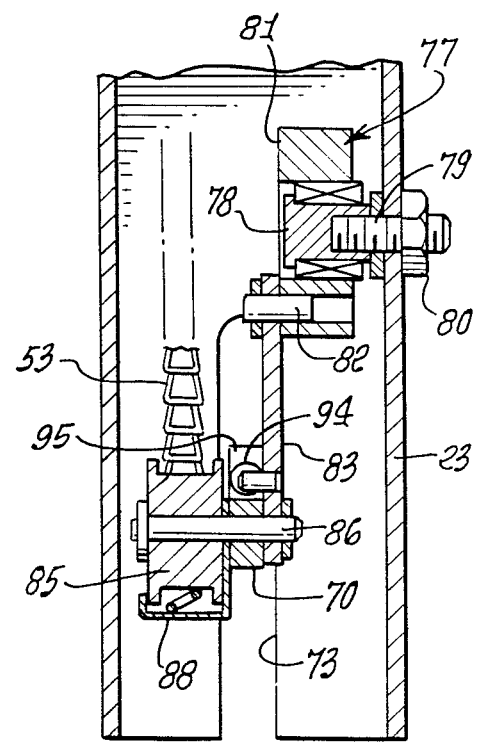
FIG. 10 is a partial vertical sectional view taken along the line 10—10 in FIG. 9.

Referring to FIGS. 5-7, a toothed wheel or sprocket 51 rotates freely on a shaft 52 which is journaled in the base casting 25. A drive line, typically a chain 53, engages the sprocket 51 for rotating the sprocket. A ratchet 55 is connected to the inner shaft 52 by a pin or screw 56. A ratchet and outer shaft member 57 rotates on the inner shaft 52 and includes a bevel gear 58 for mating with another bevel gear 59, which second bevel gear drives the film advance gear 37 (FIG. 2).

Pawls 61, 62 pivot on a pin 63 carried by the sprocket 51. A spring 61' (FIG. 5) on the pin 63 engages the pawl 61 and urges it in the clockwise direction as viewed in FIG. 7 to engage the ratchet 55. Another spring 62' on the pin 63 engages the pawl 62 to urge it in a counterclockwise direction as viewed in FIG. 6 to engage the ratchet 57. The pawl and ratchet shown in FIG. 6 drive the film magazine the outer shaft 57 and the gears 58, 59 and 37, and the pawl and ratchet shown in FIG. 7 drive the shutter 43 through the shaft 52.

An arm 66 carries a pin which is connected by a spring 67 to a similar pin carried by the shutter 43. In operation, rotation of the sprocket 51 in one direction provides for shutter motion in a first direction to make an exposure, and rotation of the sprocket in the opposite direction provides for film advance and shutter motion in the opposite direction to reset the camera for the next exposure, all in the conventional manner.

Turning to FIGS. 1 and 8–10, an actuating lever 70 pivots on a pin 71 carried in a bracket 72 attached to the upright tube 23. The lever projects forward from the tube through a slot 73 and carries an actuating pad 74 at its outer end.

A one-way rotating clutch 77 is mounted within the tube 23. The clutch may be a conventional unit, such as a Torrington RC-061008, with an inner member 78 affixed to the tube 23 by a screw 79 and nut 80 which provides a first connecting point, and with a rotatable outer member 81 coupled to the lever 70 by a pin 82 which provide a second connecting point, and a link 83.

A roller 85 is carried on the lever 70 by a pin 86. The lower end of the chain 53 is affixed to the tube 23 by a screw 87 and passed under the roller 85 which serves as a chain guide. A retainer clip 88 is carried on the lever 70 and functions to prevent the chain from moving off the roller 85.

Springs 91, 92 are positioned in aligned openings in the lever 70, on opposite sides of a pin 93 carried by the link 83. Preferably a rivet 94 is positioned within each spring, with the rivet head disposed in a transverse slot 95 in the lever 70. The lower end of the link 83 is connected to the lever by a pin 97.

A tension spring 99 is mounted within the upright tube 23 and is connected between the other end of the chain 53 and a bracket 100 affixed to the interior of the tube 23.

In operation, the security guard or other person actuating the camera, places the identification card of the person to be photographed on the base 21, the person looks into the lens through the lens block 27, and the security guard presses down on the pad 74. This moves the lever 70 down from the position of FIG. 1 to the position of FIGS. 8–10, pulling down one end of the chain, rotating the sprocket 51, the pawl 61, the ratchet 55 and the inner shaft 52, and extending the tension spring 99. This action actuates the shutter to make the exposure through the two lenses. On release of the lever 70 by the security guard, the spring 99 returns to its rest position, rotating the sprocket 51, the pawl 62, and the outer shaft 57 and bevel gear 58 in the opposite direction and pulling the lever 70 up to the position shown in FIG. 1. This advances the film and the camera is ready for the next exposure.

The clutch 77 includes a one-way bearing which rotates only in one direction. In order to take a picture, the lever 70 must be depressed all the way down to activate the shutter, and then released to return to the full upward position which advances the film. The one-way bearing of the clutch will not allow the lever 70 to return to its upward position unless a full rotational cycle has been completed. The springs 91 and 92 serve to prevent the clutch 77 from stopping at the exact center, top or bottom.

The tension spring 99 provides a lightweight and positive mechanism for actuating the camera in response to movement of the control lever. The spring does not require any particular orientation of the camera, and because it is always under some tension and therefore does not strike the inner surfaces of the tube 23, the noise and impact caused by the hanging prior art counterweight are eliminated.

We claim:

1. In a camera having a frame, a first lens and a second lens, a shutter for the lenses, a film magazine holder, and drive means for driving the shutter and advancing film in the magazine, with the drive means including two drive shafts, a drive line connected at one end to the frame and coupled to the drive shafts, and an actuating lever pivoted to the frame and coupled to the drive line for rotating the shafts, the improvement comprising a first tension spring connected to the frame and to the other end of the drive line with the lever and drive line rotating one drive shaft in one direction and extending said first spring when the lever is actuated, and with said first spring and drive line rotating the other drive shaft in the opposite direction when the lever is released.

2. The camera as defined in claim 1, including in combination:

rotatable clutch means having first and second connecting points with said second connecting point rotatable about said first connecting point and with said first connecting point connected to the frame; and a link connected between said second connecting point and the actuating lever, with pivoting of the actuating lever rotating said clutch second connecting point relative to said first connecting point.

3. The camera as defined in claim 2, in which the clutch means is rotatable in only one direction, whereby the second connecting point continues to rotate in the same direction when actuated by the lever and by the first spring.

4. The camera as defined in claim 1 which includes two ratchet mechanisms, each of which is associated with a separate drive shaft, for rotating them in opposite directions upon utilization of the lever and the first spring.

5. The camera as defined in claim 2, including spring means connected between the actuating lever and said link intermediate said second connecting point and the actuating lever.

6. The camera as defined in claim 5, wherein said spring means includes a second compression spring positioned between said link and a first location on the actuating lever, and a third compression spring positioned between said link and a second location on the actuating lever spaced from said first location.

7. The camera as defined in claim 6, wherein said first and second locations are on opposite sides of the link and the second and third springs are on opposite sides of the link in yieldably opposed relationship.

* * * * *